(12) United States Patent
Verho

(10) Patent No.: US 12,234,727 B2
(45) Date of Patent: Feb. 25, 2025

(54) OPERATING SYSTEM, ROCK DRILLING RIG AND METHOD

(71) Applicant: SANDVIK MINING AND CONSTRUCTION OY, Tampere (FI)

(72) Inventor: Samuli Verho, Tampere (FI)

(73) Assignee: Sandvik Mining and Construction Oy, Tampere (FI)

( * ) Notice: Subject to any disclaimer, the term of this patent is extended or adjusted under 35 U.S.C. 154(b) by 0 days.

(21) Appl. No.: 18/283,384

(22) PCT Filed: Mar. 31, 2022

(86) PCT No.: PCT/EP2022/058569
§ 371 (c)(1),
(2) Date: Sep. 21, 2023

(87) PCT Pub. No.: WO2022/207791
PCT Pub. Date: Oct. 6, 2022

(65) Prior Publication Data
US 2024/0183224 A1 Jun. 6, 2024

(30) Foreign Application Priority Data
Mar. 31, 2021 (EP) .................................. 21166442

(51) Int. Cl.
*E21B 7/02* (2006.01)
*E21B 15/04* (2006.01)

(52) U.S. Cl.
CPC .............. *E21B 7/022* (2013.01); *E21B 7/025* (2013.01); *E21B 15/045* (2013.01)

(58) Field of Classification Search
CPC ......... E21B 7/022; E21B 7/025; E21B 15/045
See application file for complete search history.

(56) References Cited

U.S. PATENT DOCUMENTS

| | | | |
|---|---|---|---|
| 2013/0048382 A1* | 2/2013 | Rudinec | ................. E21B 7/025 175/57 |
| 2013/0228377 A1* | 9/2013 | Kuittinen | ................ B60L 1/003 173/27 |

FOREIGN PATENT DOCUMENTS

| | | |
|---|---|---|
| AU | 2011325086 B2 | 10/2015 |
| EP | 2955319 A1 | 12/2015 |
| EP | 3536864 A1 | 9/2019 |
| WO | 9902814 A1 | 1/1999 |

\* cited by examiner

*Primary Examiner* — Kristyn A Hall
(74) *Attorney, Agent, or Firm* — Corinne R. Gorski

(57) ABSTRACT

An operating system, rock drilling rig and method for operating an electrically operated rock drilling rig. The operating system includes an electric system connected to an electric supply source and having one or more electric motors controlled by electric control devices. The system further includes a hydraulic system having one or more hydraulic pumps and hydraulic control devices. There are hydraulic tramming actuators connected to closed loop hydraulic circuits and hydraulic drilling actuators connected to either open or closed loop circuits.

14 Claims, 4 Drawing Sheets

OPERATING SYSTEM, ROCK DRILLING RIG AND METHOD

RELATED APPLICATION DATA

This application is a § 371 National Stage Application of PCT International Application No. PCT/EP2022/058569 filed Mar. 31, 2022 with priority to EP 21166442.0 filed Mar. 31, 2021.

BACKGROUND OF THE INVENTION

The invention relates to an operating system of an electrically operated rock drilling rig. The operating system is provided with an electric system connected to an electric supply and provided with electric motors which are controlled by means of electric control devices. The operating system also comprises a hydraulic system.

The invention further relates to an electrically operated rock drilling rig and to a method of operating it.

The field of the invention is defined more specifically in the preambles of the independent claims.

In mines and at other work sites different type of rock drilling rigs are used for drilling drill holes to rock surfaces. The rock drilling rigs are provided with one or more booms and rock drilling machines are arranged at distal ends of the booms. Typically, the rock drilling machine comprises a percussion device and a rotating device, and the rock drilling machine is movable by means of a feed device. These devices may be hydraulic actuators. The rock drilling rigs comprise also tramming means for moving them. Electrification of the rock drilling rigs is coming more common and hydraulic actuators are substituted with electric ones. A trend is to provide the rock drilling rigs with electrified drivelines with electric tramming motors. Attempts at substituting the hydraulic drilling actuators with electric actuators have also shown. However, the known solutions for the electrification have shown some disadvantages.

BRIEF DESCRIPTION OF THE INVENTION

An object of the invention is to provide a novel and improved operating system, a rock drilling rig equipped with such operating system and a method for controlling its operation.

The operating system according to the invention is characterized by the characterizing features of the first independent apparatus claim.

The rock drilling rig according to the invention is characterized by the characterizing features of the second independent apparatus claim.

The method according to the invention is characterized by the characterizing features of the independent method claim.

An idea of the disclosed solution is that an operating system of an electric operated rock drilling rig comprises an electric system and a hydraulic system. The hydraulic system comprises one or more hydraulic pumps driven by electric motors, and further, one or more hydraulic tramming actuators and one or more hydraulic drilling actuators. Further, the hydraulic system comprises at least one closed loop hydraulic circuit and at least one open loop hydraulic circuit. The mentioned at least one tramming actuator is operated by means of a first closed loop hydraulic circuit and one of the mentioned hydraulic drilling actuators is operated by means of a first open loop hydraulic circuit. The mentioned first closed loop hydraulic circuit and the first open loop hydraulic circuit have a common hydraulic pump and electric motor, whereby the first closed loop and the first open loop circuits are operated in turns under control of at least one hydraulic control device.

In other words, the operating system combines the closed loop hydraulic systems and open loop hydraulic systems when operating different hydraulic actuators needed in rock drilling measures.

An advantage of the disclosed solution is that the operating system utilized effectively advantages of hydraulics and electric systems. Due to the use of hydraulic actuators the system can be simpler and more compact when compared to fully electrified systems. On the other hand, controllability of the system can be increased when hydraulic pumps are driven with electric motors controlled by electric control devices.

Compared to a fully electric operating system, the disclosed solution is less expensive and simpler since num-ber of expensive power electronic components may be lower. The lower amount of power electronic components onboard means decreased need for cooling which also makes the solution simpler.

An additional advantage is that a common hydraulic pump and electric motor is used for generating hydraulic power selectively to the closed loop hydraulic circuit of the hydraulic tramming actuator and to the open loop hydraulic circuit connectable to one or more hydraulic drilling actuators. The same electric driven motor-pump unit can then be used both for closed circuit hydraulics for driving and for the drilling in open circuit hydraulics.

Having the disclosed electric motor for driving the hydraulic pump for powering the closed hydraulic circuit and driving the electric motor by an electric control device, almost all the advantages of a full electrified system can be reached. The disclosed solution implements effectively accurate and sophisticated electric control of electric motors driving the hydraulic pumps. Rotation speed and direction of the electric motors of the pumping units may be controlled in a versatile manner.

In the open loop hydraulic system valve losses may be avoided since the actuator is controlled by controlling the electric motor arranged to drive the pump powering the open loop hydraulic system. This way, driving of the actuator connected to the open loop circuit is energy efficient.

The system is a kind of a hybrid system since it implements effectively the open and closed hydraulic circuits and electric control of the hydraulic pumps.

According to an embodiment, the mentioned hydraulic control device of the hydraulic system is a selector valve for selecting between two selectable hydraulic circuits configured to be powered by means of the one common hydraulic pump. There is no need for control valves controlling pressure and flow of hydraulic fluid in the system since the operation of the hydraulic actuators can be controlled by controlling the electric motors driving the hydraulic pumps.

According to an embodiment, in the closed loop hydraulic circuit pressurized hydraulic fluid flows directly from the hydraulic pump to the hydraulic actuator, which is typically a hydraulic motor, and returns directly to the hydraulic pump without entering a tank or other hydraulic fluid reservoir. The flow and direction of the hydraulic fluid controls the hydraulic motor. The hydraulic motor can operate in either directions. In the closed loop system hydraulic pressure and flow is generated only when needed and only as much as required. Therefore, the system may be energy efficient. An advantage of the closed loop hydraulic circuit is that the system is compact, light-weight and offers precise motor control. Further, the closed loop systems have versatile control options and the direction of movement of the actuator can be reversed without the use of valves. Thus, this type of system is simple and cost-effective. The system is often easy and inexpensive to maintain.

According to an embodiment, in the open loop hydraulic system an inlet port of the hydraulic pump and a return port of the hydraulic actuator are both connected to a tank. Then the hydraulic pump provides continuous fluid flow to the system. The fluid flows through the system and returns to the tank, whereupon fresh fluid is drawn from the tank and is pumped back into the system. Actuator speed and direction can be achieved through directional control valves and flow regulating valves positioned between the hydraulic actuator and the hydraulic pump. When the open loop hydraulics circuit is supplied by a hydraulic pump driven by a speed controlled electric motor, then the actuator can be controlled by controlling rotation speed of the electric motor. An advantage of the open loop system is that it suits well for linearly moving hydraulic actuators, such as cylinders requiring different amounts of fluid flow when driving in different movement directions.

According to an embodiment, the disclosed operating system further comprises a first tramming circuit for operating a hydraulic first tramming actuator and a second tramming circuit for operating a hydraulic second tramming actuator. Both tramming circuits have two modes so that they are controllable from tramming modes to drilling modes and vice versa. In the tramming modes the tramming circuits are configured to operate the hydraulic tramming actuators by means of closed loop hydraulic systems. In the drilling mode the first tramming circuit is configured to operate a first drilling actuator by means of the first open loop hydraulic circuit. In the drilling mode the second tramming circuit is configured to operate a second drilling actuator by means of a second closed loop hydraulic circuit. In other words, the second tramming circuit operates continuously with the closed loop hydraulic circuit and only the hydraulic actuator driven by the second tramming circuit is selected during the operation. The first tramming circuit changes not only the driven hydraulic actuator but also the operating principle is changed between the closed loop and open loop principles.

According to an embodiment, the rotation device is connectable to be driven by means of the closed loop hydraulic system. In other words, the rotation device is provided with hydrostatic drive system comprising one or more hydraulic rotation motors connected to the closed loop hydraulic system.

According to an embodiment, the rotation device and the tramming actuator are selectively connected to be operative in the closed loop hydraulic system.

According to an embodiment, the feed device is connectable to be driven by means of the first open loop hydraulic circuit.

According to an embodiment, the feed device is a hydraulic motor.

According to an embodiment, the percussion device is connectable to be driven by means of the first open loop hydraulic circuit.

According to an embodiment, operation of the percussion device can be controlled by means of a speed controlled electric motor configured to drive the hydraulic pump supplying hydraulic fluid to the first open loop hydraulic circuit.

According to an embodiment, the electric motors are speed controlled motors controlled by means of the at least one electrical control device. In other words, operation of the hydraulic actuator connected to the hydraulic circuit is controlled by controlling rotating speed of the electric motor.

According to an embodiment, the hydraulic circuit may be without control valves or other control elements mounted to the hydraulic circuit for adjusting magnitude of hydraulic flow and pressure. However, there may be a hydraulic control element, such as a valve for selecting between the closed loop and open loop, i.e. directing the generated hydraulic fluid flow to the desired system and to make thereby selection which actuator is operated.

According to an embodiment, the electric motors are torque controlled motors controlled by means of the at least one electrical control device.

According to an embodiment, the electric motors are speed and torque controlled motors controlled by means of the at least one electrical control device.

According to an embodiment, the electric motors arranged to drive the hydraulic pumps a controlled by means of frequency converters. In other words, the electric motors of the pumping feature are inverter controlled motors and the inverters are arranged to vary motor input frequency and voltage. Thus, pumping units of the operating system comprise VFD controllers (VFD=Variable Frequency Drive).

According to an embodiment, the speed and torque of the electric motor is controlled by means of another type of driver than the inverter. Thus, a DC motor speed controller or driver can be implemented, for example.

According to an embodiment, the hydraulic pumps are fixed displacement pumps. The fixed displacement pumps are typically less expensive than the variable displacement pumps. Further, structure of the fixed displacement pumps may be simple and more durable.

According to an embodiment, the closed loop hydraulic circuits comprise by-pass flow channels for allowing cooling and filtering of the hydraulic fluid circulating in the closed loop hydraulic circuits. Thereby, a controlled small fluid flow can be conveyed away from the closed loop circuit. A filtered and cooled fresh hydraulic fluid flow may substitute the discharged fluid flow.

According to an embodiment, the operating system comprises at least one control unit for controlling the electrical control devices and the hydraulic control devices for controlling operations of the closed loop and open loop hydraulic circuits in response to input control parameters and control commands. In other words, the control unit may provide electrical control commands and signals to inverters or corresponding motor control devices as well as to flow directing electrical valves intended for directing fluid flows to different hydraulic circuits and actuators.

According to an embodiment, the disclosed solution relates to a rock drilling rig. The rock drilling rig comprises: a movable carrier and at least one hydraulic tramming actuator for moving the carrier; at least one drilling boom mounted movably relative to the carrier; at least one drilling unit mounted to the at least one drilling boom and comprising a rock drilling machine provided with at least one of the following hydraulic drilling actuators: at least one hydraulic percussion device, at least one hydraulic rotating device and at least one hydraulic feed device; at least one electric system connected to at least one electric supply source and comprising at least one electric motor controlled by means of at least one electric control device; at least one hydraulic system comprising at least one hydraulic pump driven by means of the at least one electric motor, and at least one hydraulic control device; and an operating system for controlling tramming and drilling measures. Further, the operating system is in accordance with the features and embodiments disclosed in this document.

According to an embodiment, the rock drilling is provided with a hydrostatic drive system comprising one or more hydraulic tramming motors connected to the closed loop hydraulic system. Further, one of the hydraulic drilling actuators is connectable via the first open loop hydraulic circuit to be driven by means of the same pump-motor arrangement as the hydrostatic drive system.

According to an embodiment, the rock drilling rig comprises at least one onboard electric energy storage.

According to an embodiment, the rock drilling rig is a battery driven mobile work machine.

According to an embodiment, the onboard electric storage is a battery, battery package, capacitor or a supercapacitor.

According to an embodiment, energy may be stored as a chemical or electrical charge.

According to an embodiment, the rock drilling rig is provided with a motor-generator unit for generating electric energy. The unit may be an auxiliary device, or it may be implemented as a predominant electric source.

According to an embodiment, the rock drilling rig is provided with at least one left side hydraulic tramming motor and at least one right side hydraulic tramming motor, whereby the carrier is steered by operating the tramming motors on opposite sides of the carrier at different speeds; and wherein the left and right side tramming motors are both connected to the dedicated closed loop hydraulic circuits whereby the steering of the carrier is executed by controlling the electric motors driving the hydraulic pumps of the closed loop hydraulic circuits. In other words, turning of the rock drilling rig is accomplished by differential steering.

According to an embodiment, the rock drilling rig is a four-wheeled vehicle, wherein left-side wheels can be driven independently of right-side wheels. Then a so called skid steering is accomplished.

According to an embodiment, the rock drilling rig is a tracked vehicle provided with two crawler tracks on opposite sides of the carrier.

According to an embodiment, the rock drilling rig is alternatively a frame steered vehicle, or it may comprise wheels which can be turned relative to the carrier. In these embodiments one hydraulic tramming motor may be enough since no differential steering, which requires two tramming motors, is no implemented. However, also in this case the hydraulic tramming motor is controlled by means of the electric motor of the closed loop hydraulic circuit. Thus, the operating system of the rock drilling rig is the same despite of the steering principle and system.

According to an embodiment, the operating system comprises a regenerative braking feature, whereby the rock drilling rig is provided with a possibility to energy recovery in situations when deceleration of the carrier occurs.

According to an embodiment, the disclosed solution relates to a method of operating an electrically operated rock drilling rig. The method comprises: tramming a movable carrier of the rock drilling rig by means of at least one hydraulic tramming actuator; operating at least one rock drilling machine provided with at least one of the following hydraulic drilling actuators: at least one hydraulic percussion device, at least one hydraulic rotating device and at least one hydraulic feed device; generating hydraulic power to at least one hydraulic system by means of at least one hydraulic pump driven by means of at least one electric motor connected to at least one electric system of the rock drilling rig; and controlling the tramming and drilling measures of the rock drilling rig by means of an operating system. The method further comprises using one common hydraulic pump and electric motor for generating hydraulic power selectively to a first closed loop hydraulic circuit being in fluid connection with the at least one hydraulic tramming actuator, and to a first open loop hydraulic circuit being in fluid connection to the at least one hydraulic drilling actuator. Further, the selection between the first closed loop hydraulic system and first open loop hydraulic system is executed under control of the operating system.

The above disclosed embodiments may be combined in order to form suitable solutions having those of the above features that are needed.

BRIEF DESCRIPTION OF THE FIGURES

Some embodiments are described in more detail in the accompanying drawings, in which.

For the sake of clarity, the figures show some embodiments of the disclosed solution in a simplified manner. In the figures, like reference numerals identify like elements.

Detailed Description of Some Embodiments

Figure 1:
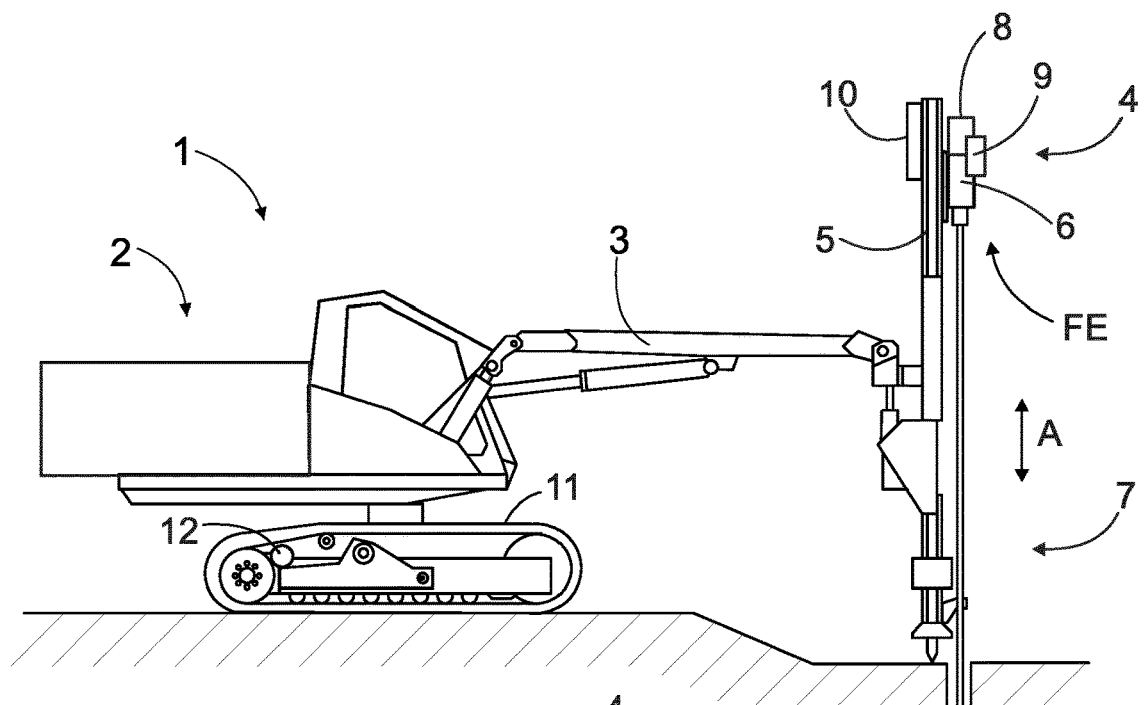
FIG. 1 is a schematic side view of a rock drilling rig equipped with crawler tracks and provided with a drilling unit equipped with several hydraulic drilling actuators.

FIG. 1 shows a rock drilling rig 1 intended for surface drilling. However, the solution disclosed in this document can be implemented in any kind of rock drilling rigs. The rock drilling rig 1 comprises a movable carrier 2 and at least one drilling boom 3 connected to the carrier 2. At a distal end portion of the drilling boom 3 is a drilling unit 4 provided with a feed beam 5 and a rock drilling machine 6 supported on it. A drilling tool 7 is connectable to the drilling machine 6. The rock drilling machine 6 is hydraulic and comprises a hydraulic percussion device 8 and a hydraulic rotating device 9. The rock drilling machine 6 may be moved A on the feed beam 5 by means of a hydraulic feed device 10. The carrier 2 may comprise crawler tracks 11 which can be driven by means of hydraulic tramming actuators 12. The rock drilling rig 1 is electrically operable and is provided with an operating system, which is accordance with the features disclosed in this document.

Figure 2:
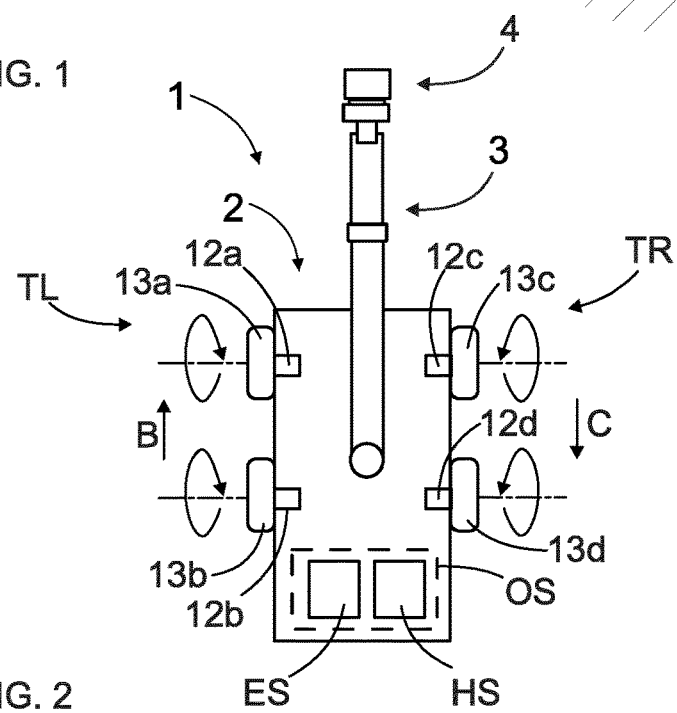
FIG. 2 is a schematic top view of a four wheeled rock drilling rig provided with electric and hydraulic systems.

FIG. 2 discloses another rock drilling rig 1 which differs from the one shown in FIG. 1 by comprising four wheels 13a-13d each of which is provided with hydraulic tramming actuators 12a-12d. The tramming actuators 12-12d may be hub motors and selected driving direction as well as steering of the carrier 2 is based on control of these motors. Arrows B and C demonstrate forces directed to the carrier 2 when the wheels 13 on opposite sides of the carrier 2 are rotated in opposite rotation directions. The tramming actuators 12a and 12b on the left tramming TL side can be driven by means of one common hydraulic pump and on the right tramming TR side tramming actuators 12c and 12d may be driven by means of another common hydraulic pump. More detailed description of the control is disclosed in connection of FIGS. 6 and 7 later in this document.

FIG. 2 further discloses that the rock drilling rig 1 comprises an operating system OS provided with an electric system ES and a hydraulic system HS. The electric system ES comprises required apparatuses for providing the system with needed electric energy as well electric motors for generating needed rotation movement for driving hydraulic pumps of the hydraulic system HS. The electric system ES further comprises electric control means for controlling operation of the electric motors, such as rotation speed, rotation direction and torque. The hydraulic system HS comprises, in addition to the mentioned hydraulic pumps, hydraulic tramming actuators 12a-12d and hydraulic drilling actuators of the drilling unit 4, such as a hydraulic percussion device, a hydraulic rotation device and a hydraulic feed device.

Figure 3:
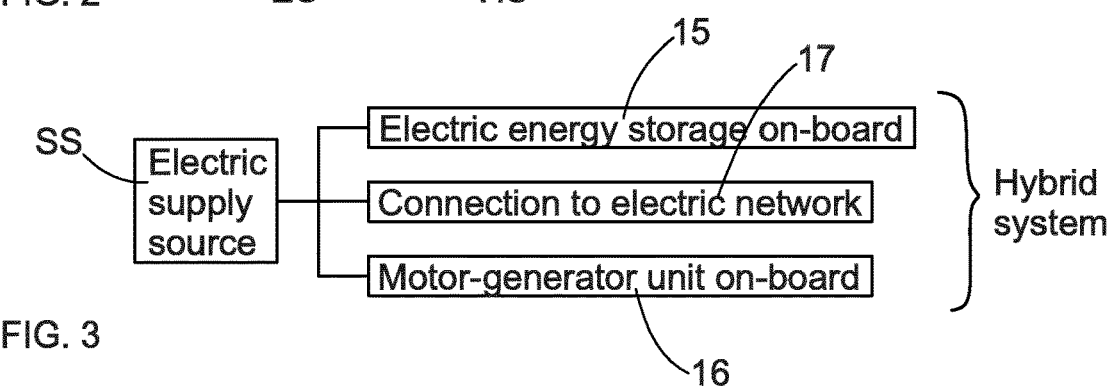
FIG. 3 is a schematic diagram of alternative electric sources which can be implemented in an electrically operable rock drilling rig.

FIG. 3 discloses that an electric supply source SS of an electrically operable rock drilling rig may comprise an electric energy storage 15 mounted on-board a carrier or, alternatively or in addition to, there may be a motor-generator unit 16 for generating the needed electric energy. The motor-generator unit may be a genset provided with a diesel engine and an electric generator. A further possibility is to provide the rock drilling rig with electric cables or corresponding means 17 for connecting it to an external electric network, such as to an electric network of a mine. FIG. 3 further shows that the electric supply source SS may a hybrid system comprising two or three of the mentioned energy sources.

Figure 4:
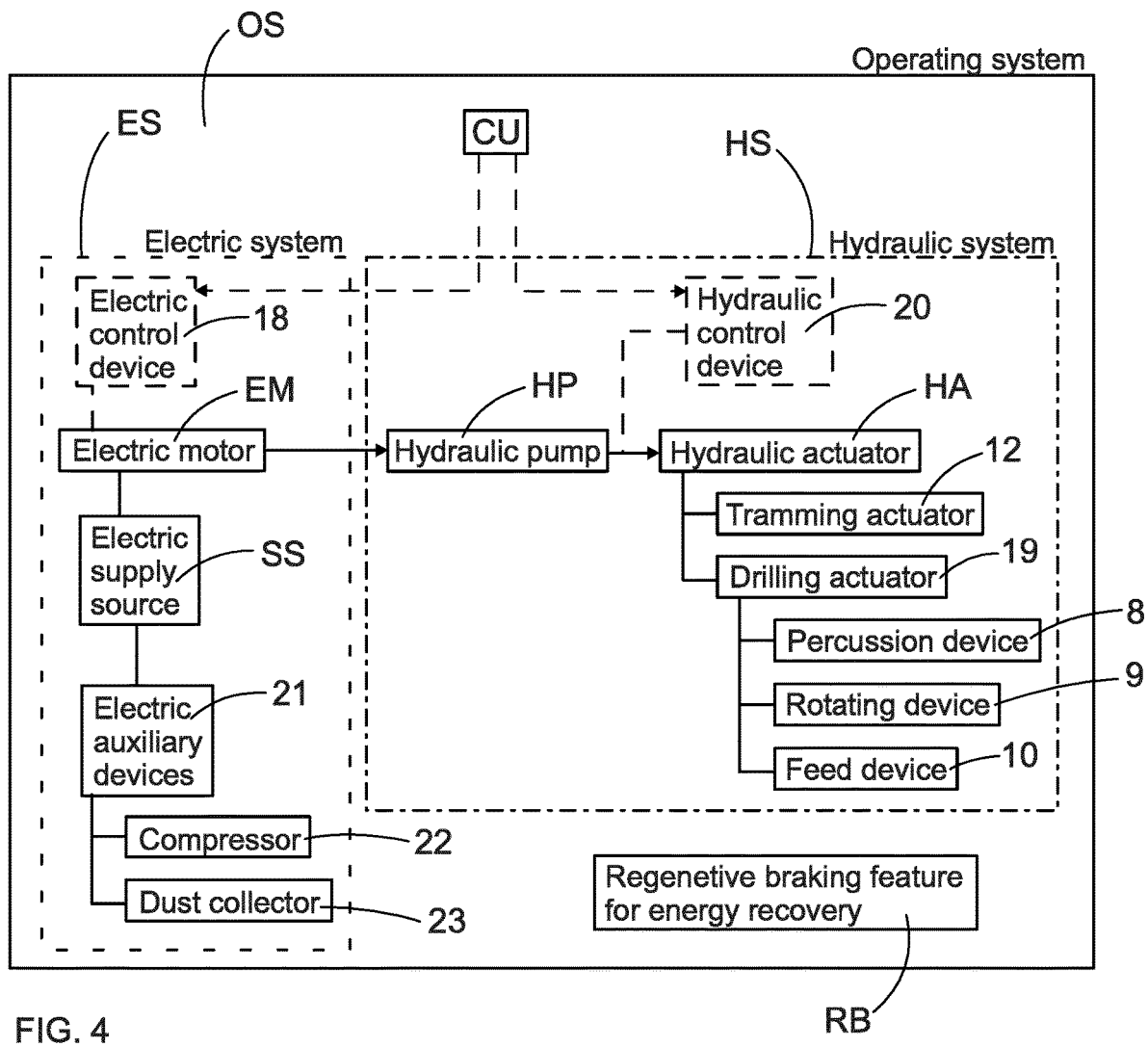
FIG. 4 is a schematic diagram of an operating system of an electrically operable rock drilling rig.

FIG. 4 discloses an operating system OS and its electric system ES and hydraulic system HS. The electric system ES comprises one or more electric motors EM controlled by means of electric control devices 18 and powered by an electric supply source SS. The hydraulic system HS comprises one or more hydraulic pumps HP and one or more hydraulic actuators HA. The hydraulic pump HP is driven by the electric motor EM and the produced pressurized hydraulic fluid is conveyed to the hydraulic actuators HA through pressure channels. The hydraulic actuators HA comprise tramming actuators 12 and drilling actuators 19, such as a percussion device 8, a rotating device 9 and a feed device 10. There are also one or more hydraulic control devices 20 such as valves for making selections between the hydraulic actuators HA.

The operating system OP comprises also at least one control unit CU for generating control signals and controlling the electrical control device 18 and the hydraulic control devices 20 in response to input control parameters and control commands.

FIG. 4 further discloses that the electric system ES may comprise one or more electric auxiliary devices 21 such as a compressor 22 and dust collector 23. The control unit CU may also control the electric auxiliary devices 21.

The operating system OS may comprise a regenerative braking feature RB and related apparatuses, for controlling the hydraulic pump HP and the electric motor EM so that energy recovery is possible in situations when deceleration of the carrier occurs.

Figure 5:
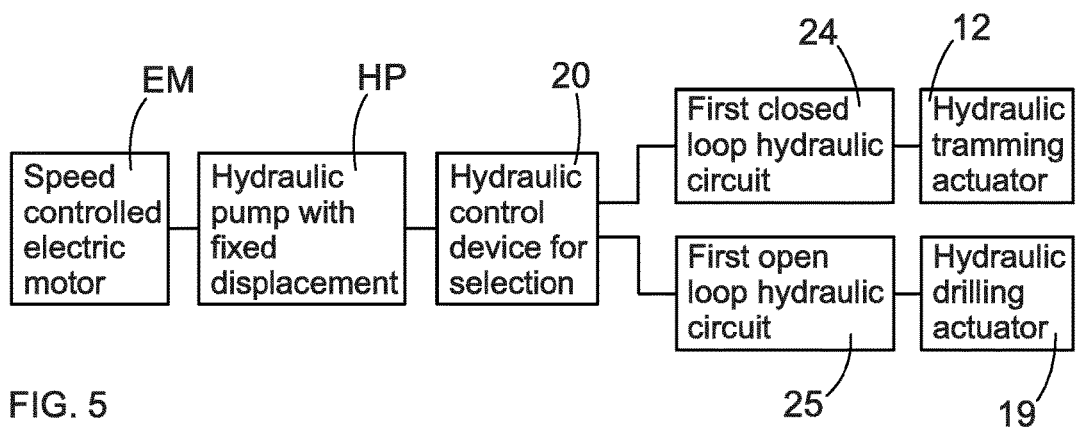
FIG. 5 is a schematic diagram showing a basic control principle of the disclosed system.

FIG. 5 discloses that a common electric motor EM and a common hydraulic pump HP are used for selectively driving a tramming actuator 12 via a closed loop hydraulic circuit 24 and a drilling actuator 19 via an open loop hydraulic circuit 25. The electric motor EM may be speed controlled and the hydraulic pump HP may be a fixed displacement type pump.

Figure 6:
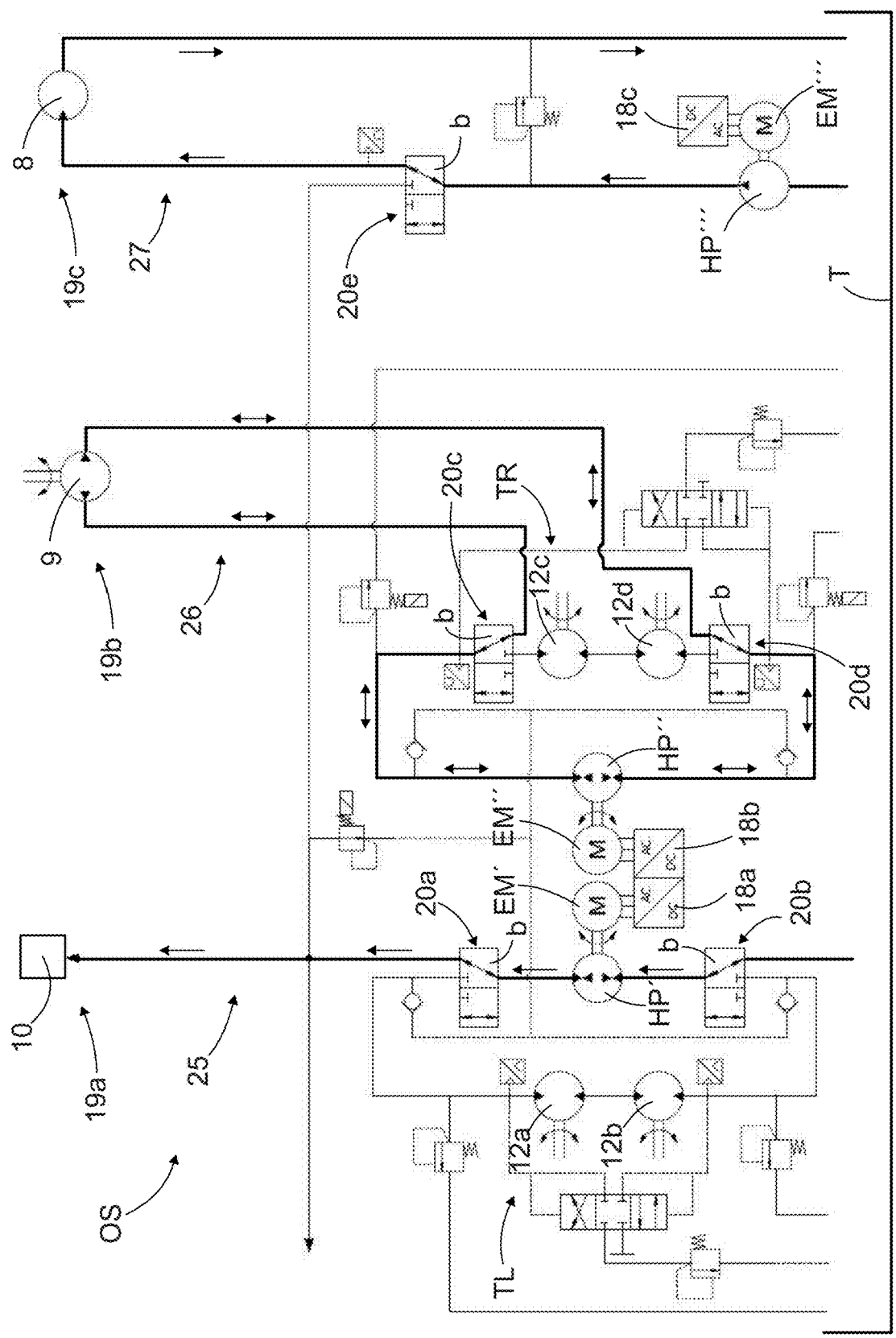
FIG. 6 is a schematic view of a hydraulic diagram of the disclosed system in a drilling mode.
Figure 7:
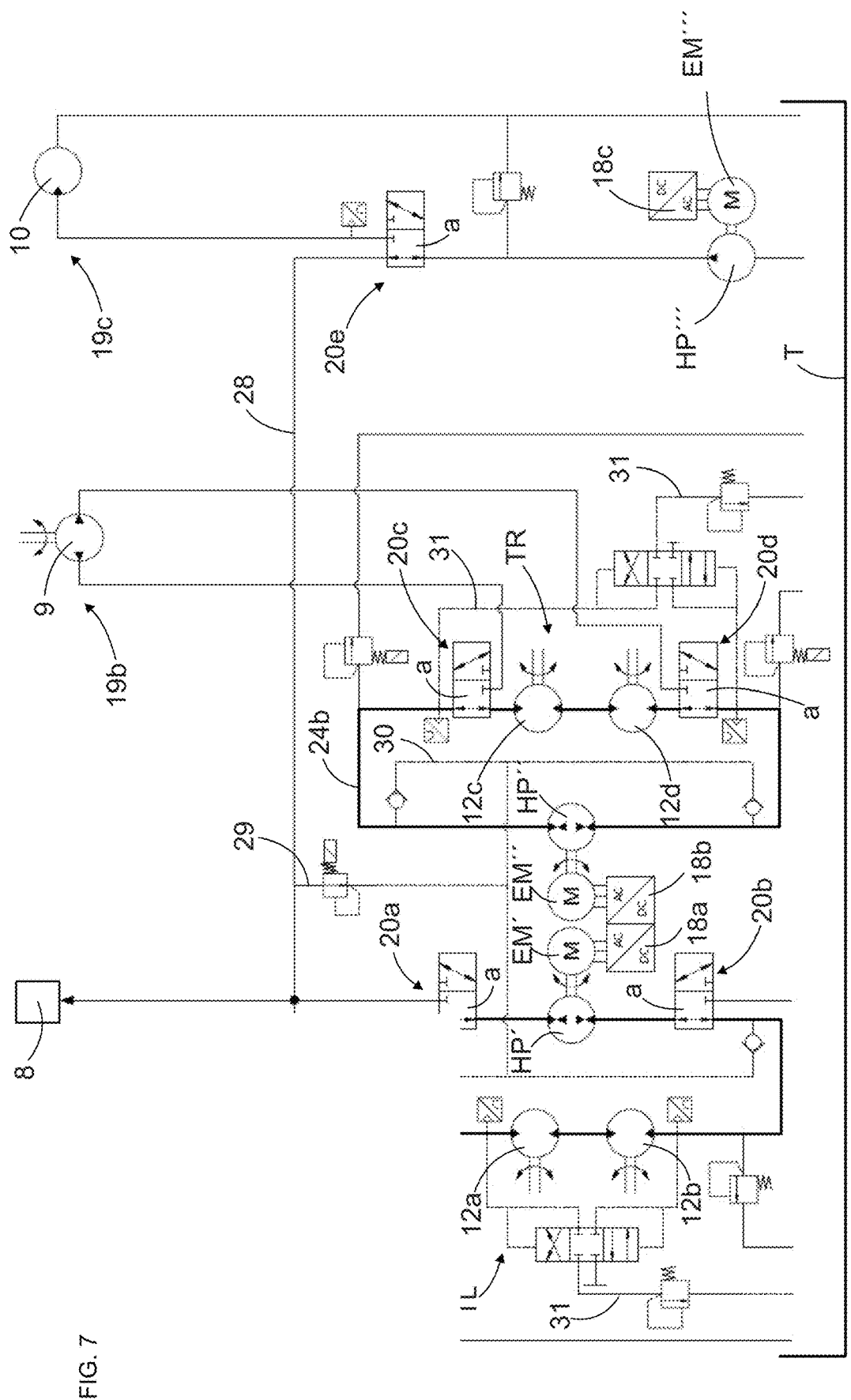
FIG. 7 is a schematic view of the hydraulic diagram of FIG. 6 in a tramming mode.

FIG. 6 discloses a hydraulic diagram of the disclosed solution in a drilling mode and FIG. 7 discloses the same hydraulic diagram in a tramming mode.

As it is shown in FIG. 7 the operating system OS and its hydraulic circuit may comprise a first tramming circuit TL for operating first hydraulic tramming actuators 12a, 12b, and a second tramming circuit TR for operating hydraulic second tramming actuators 12c, 12d. Both tramming circuits TL, TR have two modes so that they are controllable from tramming modes to drilling modes shown in FIG. 6. In FIG. 7 the tramming modes and their first closed loop hydraulic circuits 24a, 24b are emphasized, and in FIG. 6 the drilling modes and their first open loop hydraulic circuit 25 and second closed loop hydraulic circuit 26 are emphasized. FIG. 7 discloses the tramming modes wherein the tramming circuits TL, TR are configured to operate the tramming actuators 12a-12d by means of closed loop hydraulic circuits. FIG. 6 discloses that the first tramming circuit TL is configured to operate a first drilling actuator 19a by means of the first open loop hydraulic circuit 25 and the second tramming circuit TR is configured to operate a second drilling actuator 19b by means of a second closed loop hydraulic circuit 26. The mentioned first drilling actuator 19a may be a feed device 10 and the second drilling actuator 19b may be a rotation device 9. However, it is possible to select the drilling actuators in a different way too.

In FIG. 6 hydraulic control devices 20a-20d are moved to their control position b and in FIG. 7 they are in their control position a. As can be noted, control positions of selection valves serving as the hydraulic control devices 20a-20d can select whether the hydraulic circuit is connected to the tramming mode or the drilling mode.

Electric control devices 18a, 18b, such as inverters, can control speed of electric motors EM', EM" driving hydraulic pumps HP', HP".

FIGS. 6 and 7 further disclose that the operating system OS comprises a dedicated open loop hydraulic circuit 27 for operating a third drilling actuator 19c. The open loop hydraulic circuit 27 comprises a dedicated pumping unit provided with a hydraulic pump HP''', electric motor EM''' and an electric control device 18c for controlling their rotation speed. In FIG. 6 a hydraulic control device 20e, which is a selection valve, is in its control position b and directs pressure fluid flow to the third drilling actuator 19c, which may be a percussion device 8. In FIG. 7 the valve 20e is in its control position a and directs the pressure fluid flow to a hydraulic common rail circuit 28 to be used by needed auxiliary devices, for example.

The closed loop hydraulic circuits 24a, 24b may be provided with a by-pass flow channels 29-31 allowing limited flow of pressure fluid to be fed from the common rail circuit 28 through channels 29, 30 to the closed loop hydraulic circuits 24a, 24b, and further, out of them through channels 31 to a tank T so that the pressure fluid can be circulated from the closed circuits 24a, 24b.

The tank T may be slightly pressurized by pressurized air. This may be arranged to prevent cavitation in an inlet port of the first hydraulic pump HP' when working in the open loop drilling mode, FIG. 6. The hydraulic control device 20b between the pump HP' and the tank T may cause pressure drop, which can be compensated by the pressurizing the tank T.

The hydraulic circuits of FIGS. 6 and 7 comprise four tramming actuators 12a-12d since the solution pre-sented therein is designed for a four wheeled carrier provided with skid steering. However, the disclosed hydraulic circuits can be slightly modified for controlling two tramming actuators of a carrier provided with crawler tracks.

In case a carrier can be moved and steered with only one tramming actuator, then the tramming actuators 12b-12d can be left out and the electric motor EM', hydraulic pump HP' and electric control device 18b can be arranged to control operation of the second drilling actuator 19b either via a closed or open hydraulic circuit.

The drawings and the related description are only intended to illustrate the idea of the invention. In its details, the invention may vary within the scope of the claims.

The invention claimed is:

1. An operating system of an electric operated rock drilling rig, the operating system comprising:
   at least one electric system connected to at least one electric supply source and including at least one electric motor controlled by at least one electric control device;
   at least one hydraulic system including at least one hydraulic pump driven by the at least one electric motor, and at least one hydraulic control device; and
   at least one hydraulic tramming actuator and hydraulic drilling actuators selected from: at least one hydraulic percussion device, at least one hydraulic rotating device and at least one hydraulic feed device; and
   the at least one hydraulic system including at least one closed loop hydraulic circuit provided with by-pass flow channels for cooling and filtering of hydraulic fluid circulating in said closed loop hydraulic circuit, and at least one open loop hydraulic circuit, wherein the at least one tramming actuator is operated by a first closed loop hydraulic circuit of the at least one closed loop hydraulic circuit, wherein one of the hydraulic drilling actuators is operated by a first open loop hydraulic circuit of the at least one open loop hydraulic circuit, wherein the first closed loop hydraulic circuit and the first open loop hydraulic circuit have a common hydraulic pump and electric motor, and wherein the first closed loop and the first open loop hydraulic circuits are operated in turns under control of the at least one hydraulic control device.

2. The operating system as claimed in claim 1, further comprising a first tramming circuit for operating a hydraulic first tramming actuator and a second tramming circuit for operating a hydraulic second tramming actuator, wherein both first and second tramming circuits have two control modes so that they are controllable from tramming modes to drilling modes and vice versa, wherein in the tramming modes the first and second tramming circuits are configured to operate the hydraulic first and second tramming actuators by closed loop hydraulic circuits of the least one closed loop hydraulic circuit, wherein the hydraulic drilling actuators include a first hydraulic drilling actuator and a second hydraulic drilling actuator, wherein in the drilling mode the first tramming circuit is configured to operate the first drilling actuator by means of the first open loop hydraulic circuit, and the second tramming circuit is configured to operate the second drilling actuator by means of a second closed loop hydraulic circuit of the least one closed loop hydraulic circuit.

3. The operating system as claimed in claim 2, wherein the rotating device is connectable so as to be driven by the second closed loop hydraulic circuit.

4. The operating system as claimed in claim 1, wherein the feed device is connectable so as to be driven by the first open loop hydraulic circuit.

5. The operating system as claimed in claim 1, wherein the percussion device is connectable so as to be driven by the first open loop hydraulic circuit.

6. The operating system as claimed in claim 1, wherein the electric motors are speed controlled motors controlled by the at least one electrical control device.

7. The operating system as claimed in claim 6, wherein the electric motors arranged to drive the hydraulic pumps are controlled by frequency converters.

8. The operating system as claimed in claim 1, wherein the hydraulic pumps are fixed displacement pumps.

9. The operating system as claimed in claim 1, wherein the operating system includes at least one control unit for controlling the electrical control devices and the hydraulic control devices for controlling operations of the closed loop and open loop hydraulic circuits in response to input control parameters and control commands.

10. A rock drilling rig, comprising:
    a movable carrier and at least one hydraulic tramming actuator arranged for moving the carrier;
    at least one drilling boom mounted movably relative to the carrier;
    at least one drilling unit mounted to the at least one drilling boom and including a rock drilling machine provided with hydraulic drilling actuators selected from: at least one hydraulic percussion device, at least one hydraulic rotating device and at least one hydraulic feed device;
    at least one electric system connected to at least one electric supply source and including at least one electric motor controlled by at least one electric control device;
    at least one hydraulic system including at least one hydraulic pump driven by the at least one electric motor, and at least one hydraulic control device; and
    an operating system for controlling tramming and drilling measures, wherein the operating system is in accordance with claim 1.

11. The rock drilling rig as claimed in claim 10, further comprising at least one onboard electric energy storage.

12. The rock drilling rig as claimed in claim 10, wherein the at least one tramming motor includes at least one left side hydraulic tramming motor and at least one right side hydraulic tramming motor, whereby the carrier is steered by operating the at least one left and right side tramming motors on opposite sides of the carrier at different speeds, and wherein the at least one left side tramming motor is connected to the first closed loop hydraulic circuit and the at least one right side tramming motor is connected to a second closed loop hydraulic circuit, whereby the steering of the carrier is executed by controlling the electric motors driving the hydraulic pumps of the closed loop hydraulic circuits.

13. The rock drilling rig as claimed in claim 10, wherein the operating system includes a regenerative braking feature, whereby the rock drilling rig is provided with a possibility of energy recovery in situations when deceleration of the carrier occurs.

14. A method of operating an electrically operated rock drilling rig, the method comprising:
    tramming a movable carrier of the rock drilling rig by at least one hydraulic tramming actuator;
    operating at least one rock drilling unit provided with hydraulic drilling actuators selected from: at least one hydraulic percussion device, at least one hydraulic rotating device and at least one hydraulic feed device;
    generating hydraulic power to at least one hydraulic system by at least one hydraulic pump driven by at least one electric motor EM connected to at least one electric system of the rock drilling rig;

controlling the tramming and drilling measures of the rock drilling rig by an operating system;

using one common hydraulic pump of the at least one hydraulic pump and one common electric motor of the at least one electric motor for generating hydraulic power selectively to a first closed loop hydraulic circuit being in fluid connection with the at least one hydraulic tramming actuator and provided with by-pass flow channels for allowing cooling and filtering of the hydraulic fluid circulating in said closed loop hydraulic circuit, and to a first open loop hydraulic circuit being in fluid connection to the at least one hydraulic drilling actuator; and executing the selection between the first closed loop hydraulic circuit and first open loop hydraulic circuit under control of the operating system.

* * * * *